Dec. 9, 1969 J. A. WELCH Re. 26,733

ELASTOMERIC EXPANSION JOINT

Original Filed Feb. 15, 1965 3 Sheets-Sheet 1

INVENTOR
JOHN A. WELCH

BY Frank J. Earnhart
James A. Lucas
ATTORNEYS

ELASTOMERIC EXPANSION JOINT

Original Filed Feb. 15, 1965

INVENTOR
JOHN A. WELCH

BY Frank J. Earlen
James A. Lucas
ATTORNEYS

ELASTOMERIC EXPANSION JOINT

Original Filed Feb. 15, 1965

INVENTOR
JOHN A. WELCH

BY Frank J. Earlier Jr.
James A. Lucas
ATTORNEYS

United States Patent Office

Re. 26,733
Reissued Dec. 9, 1969

26,733

ELASTOMERIC EXPANSION JOINT

John A. Welch, Northampton Township, Summit County, Ohio, assignor to The General Tire & Rubber Company, a corporation of Ohio Original No. 3,375,763, dated Apr. 2, 1968, Ser. No. 432,471, Feb. 15, 1965. Application for reissue July 30, 1968, Ser. No. 753,811

Int. Cl. E01c *11/10;* E01d *19/06*

U.S. Cl. 94—18 12 Claims

Matter enclosed in heavy brackets [ ] appears in the original patent but forms no part of this reissue specification; matter printed in italics indicates the additions made by reissue.

ABSTRACT OF THE DISCLOSURE

An elastomeric expansion joint is used between the adjacent sections of a roadway or a bridge wherein it is desirable to maintain a relatively smooth and continuous road surface while at the same time compensating for the thermal expansion and contraction of the bridge beams and/or sections of concrete. The joint is provided with one or more deformation grooves in its upper surface and a plurality of rigid plates embedded in the elastomer, generally parallel to said surface and adapted to render the joint relatively stiff in the vertical direction and to permit the joint to deform in shear upon reduction of the width of the space between the adjacent sections.

BACKGROUND OF THE INVENTION

In the building of a bridge, rows of supporting piers are erected on suitable footings and the piers in each row are connected at the top by a suitable cross-supporting member. A plurality of parallel longitudinally extending steel I beams or precast reinforced concrete beams, spaced apart from one another, are then positioned across adjacent supporting members. Thereafter, appropriate forms are assembled on top of the beams after which fresh concrete is poured into sections or slabs defined by the shape of the forms. Generally these sections are reinforced, for instance by the incorporation of steel rods into the concrete during the pouring. After the forms are removed, there remains between the concrete sections a gap ranging up to three inches in width and adapted to allow for thermal expansion and contraction of the concrete and the supporting beams.

In the construction of a highway, the concrete is also poured into forms resting on a suitable substrate or roadbed. These forms divide the highway into discrete sections or slabs of concrete having a length which can vary from about 50 feet to several hundred feet. The thickness of the slabs can vary from about three to about six inches, depending primarily upon the magnitude of the vehicular loads to be supported. A gap of between about one-half inch and about one inch is provided between the adjacent sections of concrete to allow for thermal expansion and contract of the sections without the danger of buckling the concrete.

In the past it has been the accepted practice to fill this space or gap between the adjacent concrete slabs with a material such as hot liquid asphalt which, upon cooling, becomes viscous and acts as a sealant. Generally this asphalt is sufficiently pliable and elastic to allow for the normal expansion and contraction of the gap. However, the use of asphalt as a sealant has various drawbacks. For example, it has a tendency to become soft and sticky in hot weather, sometimes becoming sufficiently fluid so that it flows out of the gap. In cold weather it becomes quite brittle and frequently cracks, thus permitting water to penetrate underneath the slabs. Furthermore, asphalt affords almost no protection to the edges of the concrete slabs which define the gap, and consequently moisture and foreign objects such as stones, etc., work their way into the gap and cause eventual spalling of the concrete. Moreover, the asphalt often protrudes above the level of the highway, forming an annoying hump. In addition, the use of this type of sealant necessitates frequent maintenance and repeated resealing.

Instead of asphalt, it has been a common practice to use steel joints to bridge the gap between sections of concrete, but these too have been found to be inadequate in various respects, among them the fact that they are difficult to seal.

More recently various types of elastomeric seals have been suggested for use between the adjacent slabs of concrete in highways and bridges. These seals have been produced in any number of shapes and from a wide variety of different materials. This type of seal overcomes some of the problems inherent in the use of asphalt and steel joints, but is not completely satisfactory for the intended use. For example, where the seal has a relatively thin-walled honeycomb structure, it is necessary to install it below the surface of the road so that it will not wear out quickly when exposed to traffic. Additionally, it is apparent that a seal of this type does not offer any appreciable resistance to vertical deflection caused by vehicular traffic, or to ice and dirt being forced into the gap.

In evaluating an expansion joint of the type used to span the gap between adjacent slabs of concrete in a highway or bridge, various factors such as ease of installation, resistance to aging, oxidation, and moisture, and relative cost must be taken into consideration. Furthermore, a good joint should maintain a tight fit against, and protect the sides of, the concrete slabs which define the gap over a wide range of temperatures and climatic conditions. In addition, the joint should present an upper surface which is relatively smooth and is in substantial alignment with the road surface so that there is little or no noticeable vibration or thumping when the tires of a vehicle pass over it. Such a joint should be capable of taking a large and sudden vehicle load with a minimum of vertical deformation, and repeated substantial horizontal deflections without noticeable deterioration or degradation. Moreover, maintenance of such a joint should be minimal.

DETAILED DESCRIPTION OF THE INVENTION

It is an object of this invention to overcome many of the drawbacks inherent in the earlier types of expansion joints, especially those utilizing asphalt, steel, and thin-walled elastomers.

It is another object to provide a joint having an upper surface which is essentially flush with the surface of the road and which is capable of sustaining heavy traffic loads without appreciable deformation.

Another object is to provide a joint which forms a tight protective seal with the adjacent edges of the concrete slabs so that water and ice, as well as foreign objects such as stones and dirt, don't penetrate between the road and the joint and deteriorate the road surface.

A further object is to minimize the jolt of a vehicle passing over the joint.

It is still another object to provide an expansion joint adapted to span the gap between two adjacent slabs of concrete, said joint comprising a deformable elastomeric material having a top surface which is substantially flat except for at least one deformation groove, a bottom surface substantially parallel to said top surface, and a plurality of longitudinally extending rigid members embedded within the elastomeric material arranged substantially parallel to said top surface.

These and other objects will become apparent in light of the disclosure presented in the following specification and attached drawings in which.

Figure 1:
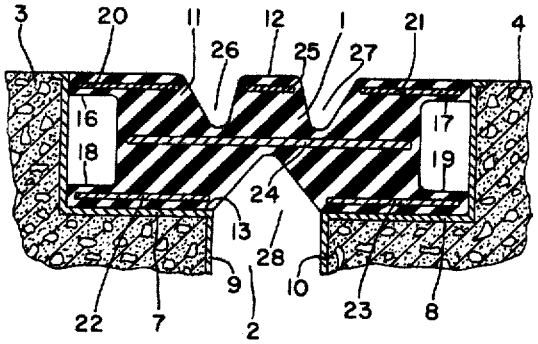
FIGURE 1 represents a cross section of one concept of the expansion joint, spanning the gap between two adjacent slabs, said joint being provided with longitudinally extending deformation grooves on the top and bottom surfaces thereof.
Figure 2:
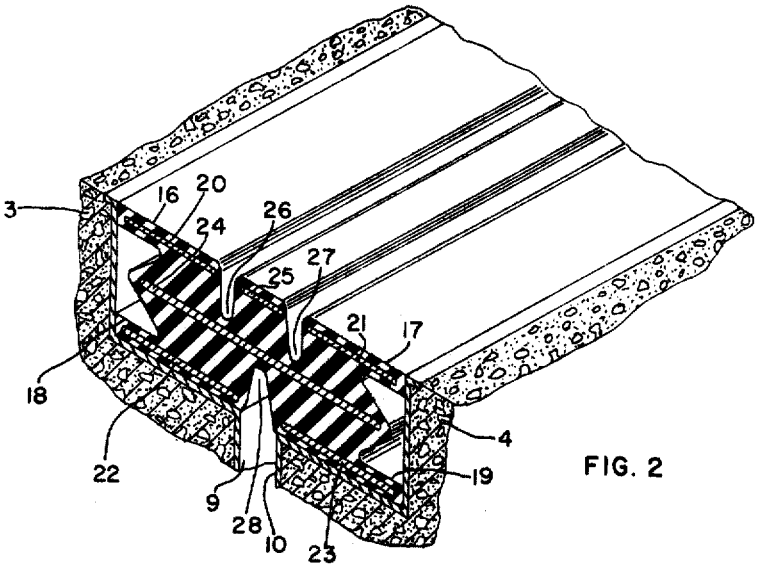
FIGURE 2 is a perspective view showing the same joint under compression between the two adjacent slabs.

Referring now to the drawings, there is shown in FIGURE 1 and FIGURE 2, as one embodiment of the invention, an elastomeric expansion joint 1 spanning the gap 2 between adjacent slabs of concrete 3 and 4. Each slab is provided with a recess, defining shoulders 7 and 8 on which the joint rests. Metal plates 9 and 10 serve to protect the edges of the concrete from cracking and spalling, and to provide a continuous and smooth surface in contact with the joint. These plates, the use of which is optional, are preferably anchored into concrete at the time of pouring.

The joint compises a deformable body of elastomeric material 11 having a top 12 and bottom 13 generally parallel to one another. The joint is of sufficient thickness so that when it is resting on plates 9 and 10 its top surface is substantially flush with the surface of the roadway. Each side of the joint is essentially channel shaped, being provided with an upper flange 16, 17 and a lower flange 18, 19 extending horizontally into abutting contact with the recessed vertical portion of one of the plates 9, 10.

The joint is provided with two generally V-shaped grooves 26, 27 on the top surface and at least one groove 28 on the bottom surface, all extending longitudinally of the joint. These grooves serve to compensate for changes in the width of the gap caused by thermal expansion or contraction of the concrete slabs and/or the bridge beams.

Embedded in, or bonded to, the elastomeric body 11 to provide rigidity to the structure are several longitudinally extending rigid plates, arranged substantially parallel to the surface of the road. Plates 20, 21, 22, and 23 extend outwardly from the grooves into the flanged side portions of said joint. Plate 24, substantially wider than the other plates, is situated in approximately the vertical mid-portion of said joint. All of these plates provide a stiffening factor for the joint serving as a resistance to the bending movement of the vertical force applied by the weight of a vehicle passing over the joint. Plate 25 is spaced above plate 24 and is located between two grooves 26, 27 near the top surface of the joint.

FIGURE 1 shows the joint in its unstressed condition spanning the gap between two adjacent slabs in, for instance, cold weather where, due to the thermal contraction of the concrete, the gap approaches its maximum width. FIGURE 2 shows the same joint under compression caused by a reduction in the width of the gap in, for instance, the summer time. It is noticed in this instance that the width of the upper grooves 26, 27 and the lower groove 28 is substantially reduced due to the deflection of the two top flanges 16, 17 and the two bottom flanges 18, 19 toward the grooves. At the same time the elastomer between the middle plate 24 and the plates 20, 21, 22, and 23 is subjected to shear deformation. These plates impart sufficient rigidity to the expansion joint while compressed between the slabs, to prevent upward buckling of the joint.

In addition to regulating the deformation characteristics of the expansion joint, the longitudinally extending rigid plates serve to minimize vertical deflection of the joint under the load of vehicular traffic. By use of these rigid plates, the elastomeric joint is made stiffer than a comparable joint of the same thickness but without these plates.

Although the joint is described as having two grooves in the top surface thereof, it should be understood that one or more grooves may be used, and that their cross-sectional shape and longitudinal configuration can be modified without departing from the novel concept therein embodied. Basically, however, the grooves should be dimensioned so that the summation of their width in a given horizontal plane through the joint should be at least as great as the maximum horizontal deflection of the joint in that plane as determined by the expansion and contraction of the adjacent sections of concrete and/or portions of the bridge. Furthermore, the number of flat, parallel reinforcing plates and their relative placement can be altered to regulate the magnitude of the shear deformation and the stiffness of the joint.

Figure 3:
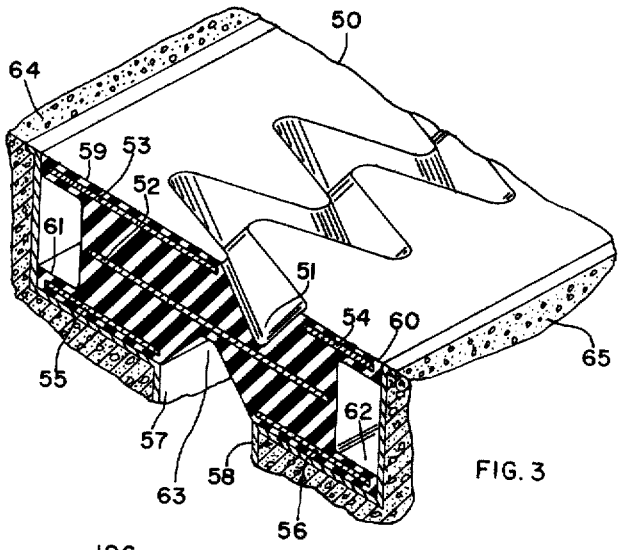
FIGURE 3 is another perspective view depicting an alternate design of the joint provided with a singular deformation groove on the upper surface thereof, said groove having a zigzag or saw-tooth configuration.

FIGURE 3 shows another embodiment of the invention wherein the expansion joint is provided with upper and lower deformation grooves, the upper groove 51 having a zigzag or saw-tooth pattern. The spacing between the adjacent waves in the groove is such that at least a portion of a tire rolling over the joint is continuously supported by a surface of the joint which is substantially flush with the surface of the road, thereby minimizing the tell-tail thump commonly felt when passing over the gap. Two rigid plates 53, 54 are embedded in the elastomer near the upper surface thereof, one on either side of the groove. One edge of plate 53 terminates near and follows the contour of the groove, and the other edge terminates in upper flange 59, and the other plate 54 is similarly disposed on the other side of the groove 51 terminating in flange 60. A horizontally extending plate 52, having a width slightly less than the width of the body portion of the joint, is disposed intermediate the top and bottom surfaces of the joint separating the upper groove 51 from the lower groove 63. Bottom plates 55, 56 are embedded in the elastomer on either side of the groove 63 and extend out into the bottom flanges 61, 62 of the joint.

In a manner similar to that of the joint previously described, the joint in FIGURE 3 is adapted to rest on the horizontally disposed portion of appropriate recesses formed in the adjacent concrete slabs 64, 65 provided with metal plates 57 and 58. The upper and lower flanges of the joint abut the vertical shoulder portions of the plates. When the concrete slabs expand, the gap therebetween contacts causing the joint to be horizontally compressed. The resultant compressive deflection of the upper flanges and of the lower flanges toward one another reduces the width of the upper and lower grooves 51, 63. The horizontally disposed plates in the joint resist the tendency of the joint to bulge or buckle during this compression and likewise serve to minimize vertical deformation of the joint when a vehicle passes over the joint.

It should be noted that both of the grooves have a cross section which is essentially V-shaped, and it is obvious that the width of the grooves should be sufficient to accommodate the maximum amount of horizontal deflection which will be encountered. Further, more than one groove can be provided on each surface, and the grooves can be of the same design or different than those shown and described.

Figure 4:
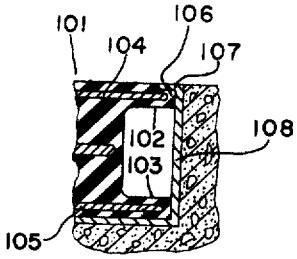
FIGURE 4 shows one means of restraining movement of the upper edges of the expansion joints shown in FIGURES 1, 2, and 3.
Figure 5:
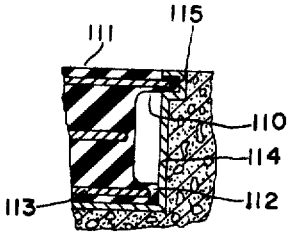
FIGURE 5 represents another modification similar to that shown in FIGURE 4 utilizing a tongue and groove joint.

In FIGURES 4 and 5 are shown variations of the joints shown in FIGURES 1, 2, and 3, said variations relating primarily to the design of the plates which are anchored to the concrete and the flanged end portions of the joints. In FIGURE 4 the joint 101 is provided with upper and lower flanged portions 102 and 103 each having a parallel rigid plate 104 and 105 embedded therein and terminating near the end of the flanges. The upper flange is provided with a notch 106, said notch adapted to engage a suitable lip 107 in plate 108 which is anchored in the concrete. The lip prevents the upper flange from raising above the surface of the roadway when, for instance, a heavy vertical load passes over the middle of the joint. FIGURE 5 shows a similar structure, with the exception that the upper flange of the joint 111 is held in place by a tongue and groove joint. The upper flange 110, having plate 111 embedded therein, preferably, but not necessarily, extends out beyond the end of the bottom flange 112 likewise provided with a rigid plate 113. Steel plate 114, anchored in the concrete to form an appropriate recess as hereinbefore described, is provided with an appropriate groove 115. The end of the upper flange forms a tongue which is inserted in this groove. This tongue and groove joint precludes the end of the joint from turning up above the surface of the roadway, and has a further advantage that it prevents downward deflection of the upper flange 110. If necessary, the upper flange of the joint in either of these embodiments can be bonded to the metal plates utilizing a suitable adhesive or the like to provide a watertight seal.

Figure 6:
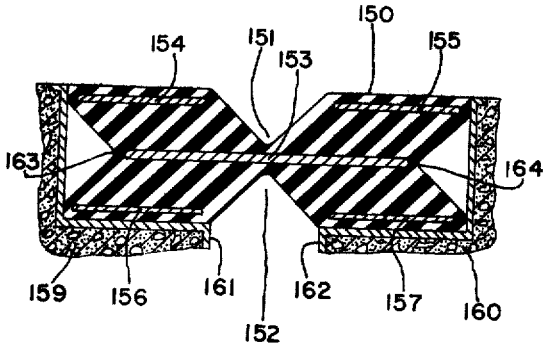
FIGURE 6 is a cross-sectional view depicting a simplified expansion joint having one deformation groove on the upper surface and one on the lower surface.

FIGURE 6 shows a simplified version of an expansion joint 150 held in position in appropriate recesses formed in adjacent concrete slabs 159 and 160. Metal plates 161, 162 are anchored to the slabs 159, 160 and from horizontal shoulders on which the joint rests, and vertical sides against which the joint abuts. This joint has one V-shaped groove 151 on its upper surface and a similar V-shaped groove 152 on the lower surface, said grooves separated from one another by a transversely extending rigid plate 153 embedded in the elastomer. The upper surface of the joint is substantially flush with the surface of the road, and is reinforced by two plates 154 and 155 bonded to and/or embedded in the elastomer. Plates 156 and 157 reinforce the bottom surface of the elastomer in like manner.

The top and bottom edges of the joint contact the vertical recessed sides of the plates 161, 162. Each side of the joint is characterized by two surfaces sloping obliquely inwardly from these edges and meeting to form a groove 163, 164 in proximity of plate 153. When the concrete slabs 159, 160 expand, the joint is subjected to horizontal deflection, the amount of said deflection being maximum at the top and bottom surfaces thereof and minimal at the plane through plate 153.

Figure 7:
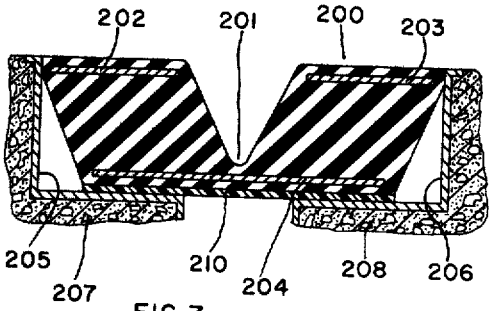
FIGURE 7 is a cross-sectional view of a simplified joint in which the botom deformation groove has been omitted.

FIGURE 7 shows another design for the joint, this joint being essentially that obtained by slicing the joint of FIGURE 6 horizontally along its mid-vertical plane. This joint, shown in position between plates 205 and 206 forming and defining appropriate recesses in adjacent slabs of concrete 207 and 208, is provided with one vertical deformation groove 201 in its upper surface. This surface, which is substantially flush with the level of the roadway, is provided with rigid plates 202 and 203 extending lengthwise thereof and substantially parallel to the roadway. A wide rigid plate 204, parallel to the plates 202, 203, serves as a reinforcing member in the lower portion of the joint. The sides of the joint contact the steel plates 205 and 206 at or near a point adjacent to the top surface thereof and angle obliquely inwardly and downwardly toward the bottom of the joint.

Reduction in the spacing of the gap between the concrete slabs urges the plates 202 and 203 toward one another thereby narrowing the width of the groove 201. At the same time, the horizontally disposed portions of the steel plates 205 and 206 move toward one another, sliding on the bottom surface of the joint. Since this sliding movement would tend to cause abrasion of the bottom surface of the joint, it is contemplated that the surface can be made of, or coated with, a low friction or highly abrasion resistant material such as rigid polyurethane or Teflon.

This joint, as well as the modification shown in FIGURE 6 and previously described, can be modified to the extent shown in FIGURES 4 and 5 in order to more securely retain the joint in place in the gap. Furthermore, these joints can be provided with more than one groove on the upper surface and the groove or grooves can be straight or saw-tooth or any other shape consistent with the teachings of this invention.

Many factors are to be considered in selecting an appropriate elastomer for the body portion of this novel expansion joint. Some of these factors are cost, ease of fabrication, resistance to the elements such as ice and snow, uniformity of properties over a wide temperature range, wear, etc. SBR, a synthetic copolymer of styrene and butadiene, may be used for this purpose inasmuch as it possesses good resistance to abrasion and impact as well as favorable cold weather characteristics. Its resistance to ozone is relatively poor, however. Other elastomers such as neoprene and ethylene-propylene rubber can also be used for the fabrication of this point, their resistance to oxidation and/or ozonation being considerably better than that of SBR. Other elastomers such as natural rubber, butyl rubber, and the like can likewise be utilized, the proper selection depending upon a balancing of the above-mentioned factors.

Figure 8:
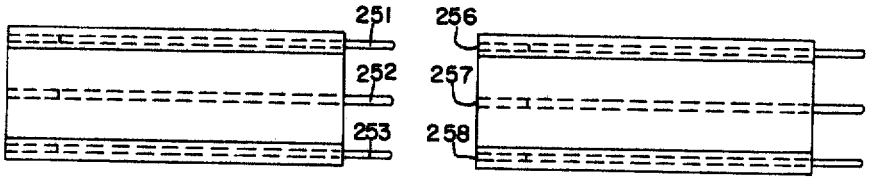
FIGURE 8 is a plan view of two joint sections wherein the rigid plates project from one end of the joint and are adapted to be inserted into appropiate slots in the next section in order to assemble sections end to end across the width of the road.

It is obvious that the gap between adjacent slabs of concrete in a roadway extends completely across the roadway, and may have a width of 20 feet or more. Although it is contemplated that the joint may be of one-piece construction, and sufficiently long to extend across the complete width of the roadway, it is more practical to fabricate the joint into short sections and to lay these sections endwise in the gap. FIGURE 8 shows a plan view of two sections of a joint which are provided with means for interlocking or engaging the same to make a continuous joint. The joint may be the same as any of the previously described embodiments shown in FIGURES 1, 3, 6, and 7 except that the rigid metal plates 251, 252, and 253 project out of the elastomer at one end, and are adapted to be inserted into appropriate slots 256, 257, and 258 in the next adjacent section. In this manner the sections can be separately laid into the gap and then slid together so that they function as an integral unit. There are, of course, other ways of assembling these sections so that they will be held together in the gap; for example, by the use of appropriate tongue and groove joints, a suitable tongue on the end of one section being adapted to engage an appropriate groove in the abutting end of the adjacent section.

Generally speaking it is desirable, when assembling a group of individual sections into a joint according to the above, that the juncture between section be made waterproof. Thus, it may be necessary to use a cement or a sealer to provide this waterproof connection. In fact, a suitable cement can be used to join these sections together thereby dispensing with the necessity of tongue and groove or dovetail joints.

It is apparent that the installation of a joint of a type described in this invention, when done in relatively warm weather, presents certain problems inasmuch as the slabs of concrete are relatively close together and the gap between them is at a minimum. In such circumstances the joint can be precompressed, either when produced or on site, and can then be placed in the gap and allowed to expand into contact with the sides of the gap.

Figure 9:
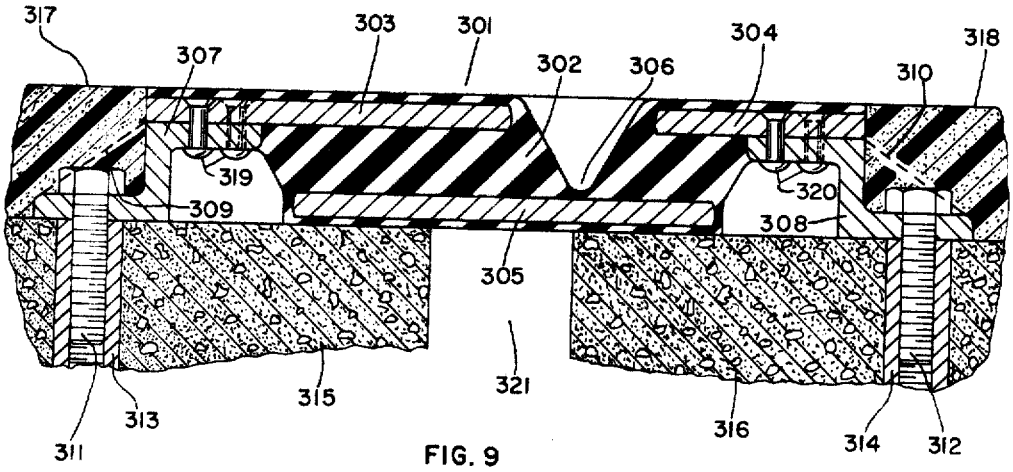
FIGURE 9 shows in cross section a modified joint which can be bolted to the concrete slabs.
Figure 10:
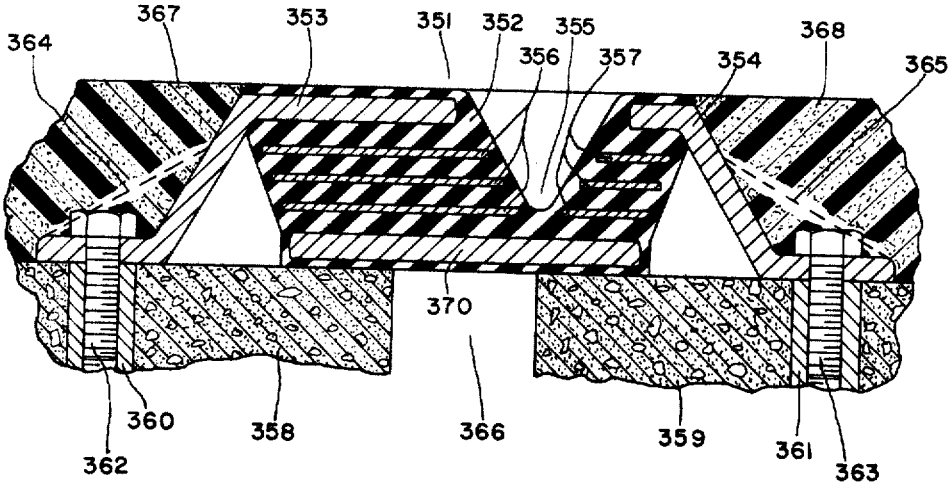
FIGURE 10 is a cross-sectional view of another variation of a joint provided with means for attaching it to the slabs.

A further embodiment of this invention is shown in FIGURES 9 and 10 wherein the expansion joint is adapted to be fastened to the subsurface of the roadway by suitable means such as bolts. As in the previous embodiments, this joint consists basically of an elastomeric body portion having a deformation groove in its top surface and a plurality of rigid, preferably metal, plates embedded in the body portion parallel to one another and to the surface of the roadway. The deformation groove may be straight or may be saw-toothed as previously explained.

In FIGURE 9 the elastomeric body portion 302 of the joint 301 is provided with a groove 306 extending the length of the joint. Plate 303 is embedded in the body portion on one side of the groove and plate 304 on the other side. The joint rests on shoulders of two adjacent concrete sections 315, 316 separated from one another by a gap 321. Adjacent the bottom of the joint and embedded in the body portion thereof is a rigid plate 305 substantially coextensive with the bottom of the joint. Embedded in the shoulder of concrete section 315 is a threaded insert 313, and in a corresponding manner insert 314 is embedded in the shoulder of section 316. A generally Z-shaped rigid metal plate 307 is attached by suitable means such as rivets 319 to the underside of metal plate 303, and is fastened to the concrete by a bolt 311 threaded into insert 313. In a like manner, fastening plate 308 is attached to plate 304 and is secured to the other section of concrete 316 by bolt 312 threaded into insert 314. These fastening plates 307, 308 are preferably reinforced with ribs 309, 310 (shown in outline) to impart rigidity thereto and to prevent fatigue failure while in use.

In the embodiments shown in FIGURE 10, attaching plates 353, 354 are bonded directly to the elastomeric body 352 of the joint 351 and are bolted directly into inserts 360, 361 by bolts 362, 363. The plate 353 is preferably reinforced by one or more reinforcing ribs 364, and plate 354 is likewise reinforced by means such as ribs 365. The bottom of the joint 351 rests upon suitable shoulders provided in the adjacent slabs of concrete 358, 359, and is reinforced by plate 370. The edges of the slabs define a gap 366. A deformation groove 355 extends downwardly from the top surface of the joint terminating short of the bottom plate 370. In order to increase the resistance of the joint to vertical deflection under load, a plurality of metal plates 356 are provided on one side of the groove, and plates 357 on the other side thereof, these plates all being spaced apart and parallel to one another and parallel to the surface of the roadway. These plates 356, 357 are preferably, but not necessarily, thinner than the top attaching plates 353, 354, and the bottom plate 370.

In the installation of the joints shown in FIGURES 9 and 10 the threaded inserts are preferably embedded in the concrete at the time of pouring, whereupon hardening of the concrete will anchor the inserts in place. The joint, which may consist of a number of sections placed longitudinally along the length of the gap or, alternatively, may be of one section extending the full length of the gap, is then anchored in place after which the space above the bolts is backfilled with a suitable material such as asphalt or concrete. Asphalt is to be preferred inasmuch as it is more easily removed if the necessity should arise for removing and replacing the joints.

Various modifications can be made in the design and construction of the joints shown in FIGURES 9 and 10 without altering the basic function thereof or departing from the novel concept therein embodied. For example, the shape and size of the Z-shaped plates, as well as the manner in which they are attached or bonded to the joint and the concrete slabs, can be varied. Likewise, the thickness of the joint as well as the number of reinforcing plates used therein are subject to variation. The number, size, and contour of the deformation grooves can also be changed. The bottom surface of the joint can be coated or otherwise treated to provide good sliding surface in contact with the concrete slabs.

The novel expansion joint of this invention can be fabricated in any number of ways constituting well known and defined practices in the art. As stated before, it may be desirable to make the joint in sections of perhaps one or two feet in length. The most common and convenient method of making sections of this nature is by molding. Accordingly, the plates are embedded in the elastomer in their proper positions prior to molding, and are bonded thereto in a molding and curing operation. Alternatively, the top and/or bottom plates instead of being embedded in the elastomer may be bonded to the surfaces of the elastomer during or after molding, utilizing a suitable molding or bonding agent. Furthermore, the elastomeric body portion can be extruded into shape with slots adapted to receive the rigid plates. These plates, which are preferably made out of a rigid material such as steel, can then be inserted into the extruded joint prior to or after curing, and can be bonded in place by heat or a suitable adhesive.

Although this novel joint has been described in relation to its use in bridges and roads, it can likewise be utilized in other structural applications wherein provisions must be made for relative movement of the sections of the structure. Thus, the joint can be used in the construction of buildings, runways, parking lots, docks, piers and the like.

With the foregoing discussion serving as an elaboration and explanation of the details of the invention, but not a limitation thereof, I claim:

1. A roadway expansion joint adapted to span a gap and comprising:
   - (a) A generally void-free elastomeric body portion having
     - (1) An essentially flat top surface exposed to roadway traffic, and
     - (2) Nonexposed surfaces comprising a flat bottom surface parallel to said top surface and a pair of sides joining said top and bottom surfaces
   - (b) A plurality of plates embedded in said body portion and spaced apart from one another, generally parallel to said top surface, one of said plates located generally no higher than midway between said top and bottom surfaces and positioned so as to span said gap when said joint is installed in place, said plates being placed, relative to one another so that the elastomer between them is subjected primarily to shear deformation when forces of contraction are applied to the sides of the joint,
   - (c) Longitudinal groove means extending down from the exposed top surface and terminating in proximity to said one plate the normal width of said groove means at the top surface being generally at least as great as the maximum intended contraction of the joint in use, and
   - (d) Relief means in said unexposed surfaces for accommodating movement of the elastomer when the width of the joint is reduced.

2. The joint according to claim 1 wherein said longitudinal groove means consist of at least one straight deformation groove.

3. The joint according to claim 1 wherein said groove means is composed of at least one groove which has a zigzag configuration.

4. In combination with a pair of adjacent sections of a roadway spaced apart so as to form a gap therebetween, each of said sections containing a joint receiving recess extending along said gap and defined by a generally horizontal shoulder and a vertical portion, an expansion joint in said recesses and spanning said gap, said joint comprising a longitudinally extending elastomeric body portion generally free of internal voids and having parallel top and bottom surfaces joined together by sides, said top surface exposed to vehicular traffic and said bottom and sides constituting the nonexposed surfaces of said joint in contact respectively with the shoulders and vertical portions of said recesses, a plurality of plates parallel to said top surface, and embedded in said body portion, one of said plates spanning the gap between the adjacent sections generally no higher than midway between said top and bottom surfaces, at least one longitudinally extending deformation groove, substantially V-shaped in cross section, extending toward said one plate from the top surface of said joint and terminating in proximity thereto, said nonexposed surfaces provided with relief means to accommodate travel of said joint during contraction of said gap.

5. The combination according to claim 4 wherein the plates are spaced with respect to one another, to said deformation groove and to said relief means so that the elastomer between the plates is subjected to substantially of said gap between the sections of the roadway.

6. The combination according to claim 5 wherein said relief means includes at least one groove extending upwardly from said bottom surface of said joint.

7. The combination of claim 5 wherein said relief means comprises a groove extending upwardly from said bottom surface and terminating near said one plate over said gap, and a pair of recesses at the sides of said joint.

8. The combination of claim 6 wherein said relief means further includes the provision of a space between the sides of the joint and the vertical portion of each recess opposite said one plate spanning the gap to accommodate the plate when said gap is reduced in width.

9. The combination according to claim 5 wherein the width of the joint at the bottom is narrower than that of the top, and the sides taper inwardly from the top to said bottom to form said relief means.

*10. An expansion joint adapted for installation in a longitudinally extending gap between adjacent sections of a roadway comprising:*

*(a) A generally void-free elastomeric body portion having,*

*(1) A substantially planar exposed top surface, and*

*(2) Non-exposed surfaces comprising:*

*(a) A planar bottom surface parallel to said top surface, and*

*(b) Sides joining said top and bottom surfaces;*

*(b) Stiffening means comprising a plurality of rigid plates, at least a substantial portion of each plate embedded in and parallel to the top and bottom surfaces of said body portion, and including one totally embedded plate positioned to span said gap when the joint is installed in place.*

*(c) At least one longitudinal groove extending downwardly from said top surface a substantial distance toward said bottom surface of said body portion and terminating in proximity to and immediately above at least one of said plates located no higher than midway between said top and bottom surfaces, the normal width of said groove means at said top surface being at least as great as the maximum intended contraction of the joint in use; and*

*(d) Relief means in said non-exposed surfaces cooperating with said groove to prevent compression of the elastomer in the body portion upon contraction of the joint.*

*11. The joint according to claim 10 wherein said relief means consist of at least one groove in the bottom surface of the body portion of said joint extending upwardly a substantial distance toward the top surface thereof and terminating in proximity to one of said embedded plates.*

*12. The joint according to claim 11 wherein the embedded co-planar portions of separate plates that normally move toward one another upon contraction of the joint are separated by at least one downwardly or upwardly extending groove.*

References Cited

The following references, cited by the Examiner, are of record in the patented file of this patent or the original patent.

UNITED STATES PATENTS

| | | | |
|---|---|---|---|
| 739,854 | 9/1903 | Gest | 94—31 |
| 2,400,493 | 5/1946 | Fischer | 94—18.2 |
| 3,055,279 | 9/1962 | Rinker | 94—18.2 |
| 3,273,473 | 9/1966 | Pare | 94—18 |
| 3,316,574 | 5/1967 | Pare | 14—16 |

FOREIGN PATENTS 943,687 12/1963 Great Britain.

JACOB L. NACKENOFF, Primary Examiner

U.S. Cl. X.R.

14—16

PO-1050
(5/69)

UNITED STATES PATENT OFFICE

CERTIFICATE OF CORRECTION

Patent No. Reissue 26,733 Dated December 9, 1969

Inventor(s) John A. Welch

It is certified that error appears in the above-identified patent and that said Letters Patent are hereby corrected as shown below:

Column 4, line 73, the word "contacts" should be -- contracts --. Column 5, line 49, change the word "from" to -- form --. Column 6, line 42, the word "point" should be -- joint --; line 74, "section" should be -- sections --. Column 9, line 32, after the word "substantially" add the following -- non-compressive shear deformation during contraction -- .

SIGNED AND
SEALED
JUN 23 1970

(SEAL)
Attest:

Edward M. Fletcher, Jr.
Attesting Officer

WILLIAM E. SCHUYLER, JR.
Commissioner of Patents